United States Patent [19]

Hapke

[11] 4,043,650
[45] Aug. 23, 1977

[54] FILM HANDLING DEVICE

[75] Inventor: Kenyon A. Hapke, Libertyville, Ill.

[73] Assignee: Bell & Howell Company, Chicago, Ill.

[21] Appl. No.: 647,803

[22] Filed: Jan. 9, 1976

[51] Int. Cl.² .................. G03B 31/00; G03B 1/48; G03B 23/02; G11B 31/00
[52] U.S. Cl. .................................... 353/15; 352/72; 353/95; 353/DIG. 2; 360/80
[58] Field of Search ............... 353/15, 26 A, 26 R, 353/95, DIG. 2; 352/72, 73, 1, 129; 354/180–182, 213, 275; 360/1, 3, 80; 242/55.18, 55.21

[56] References Cited

U.S. PATENT DOCUMENTS

| 2,067,835 | 1/1937 | Erwood | 353/DIG. 2 |
| 3,033,077 | 5/1962 | Schwartz et al. | 353/95 |
| 3,420,464 | 1/1969 | Ruditis et al. | 353/DIG. 2 |
| 3,675,994 | 7/1972 | Badalich et al. | 352/17 |
| 3,679,298 | 7/1972 | Knowles et al. | 353/95 |
| 3,914,037 | 10/1975 | Peters | 353/26 R |

Primary Examiner—Steven L. Stephan
Attorney, Agent, or Firm—John R. Hoffman; Robert J. Schneider; Roger M. Fitz-Gerald

[57] ABSTRACT

An improved film handling device or film cartridge designed for permanent mounting on a film strip projector or the like. The device or cartridge includes a base plate pivotally mounted to a sliding carriage and a storage cavity on the top of the base plate. The carriage comprises a tape cassette player and the base plate includes at least a pair of depending arms for slideably mounting a tape cassette. A drive sprocket is mounted on the base plate for engaging and feeding the film through a film gate in the projector. The carriage is movable between a generally forward, film loading position whereat the base plate is pivoted upwardly for easy access and a generally rearward, film feed position which permits the film to be transferred through the film gate. A safety interlock is provided on the cassette to prevent jamming of the film as the carriage is moved between its respective positions.

9 Claims, 4 Drawing Figures

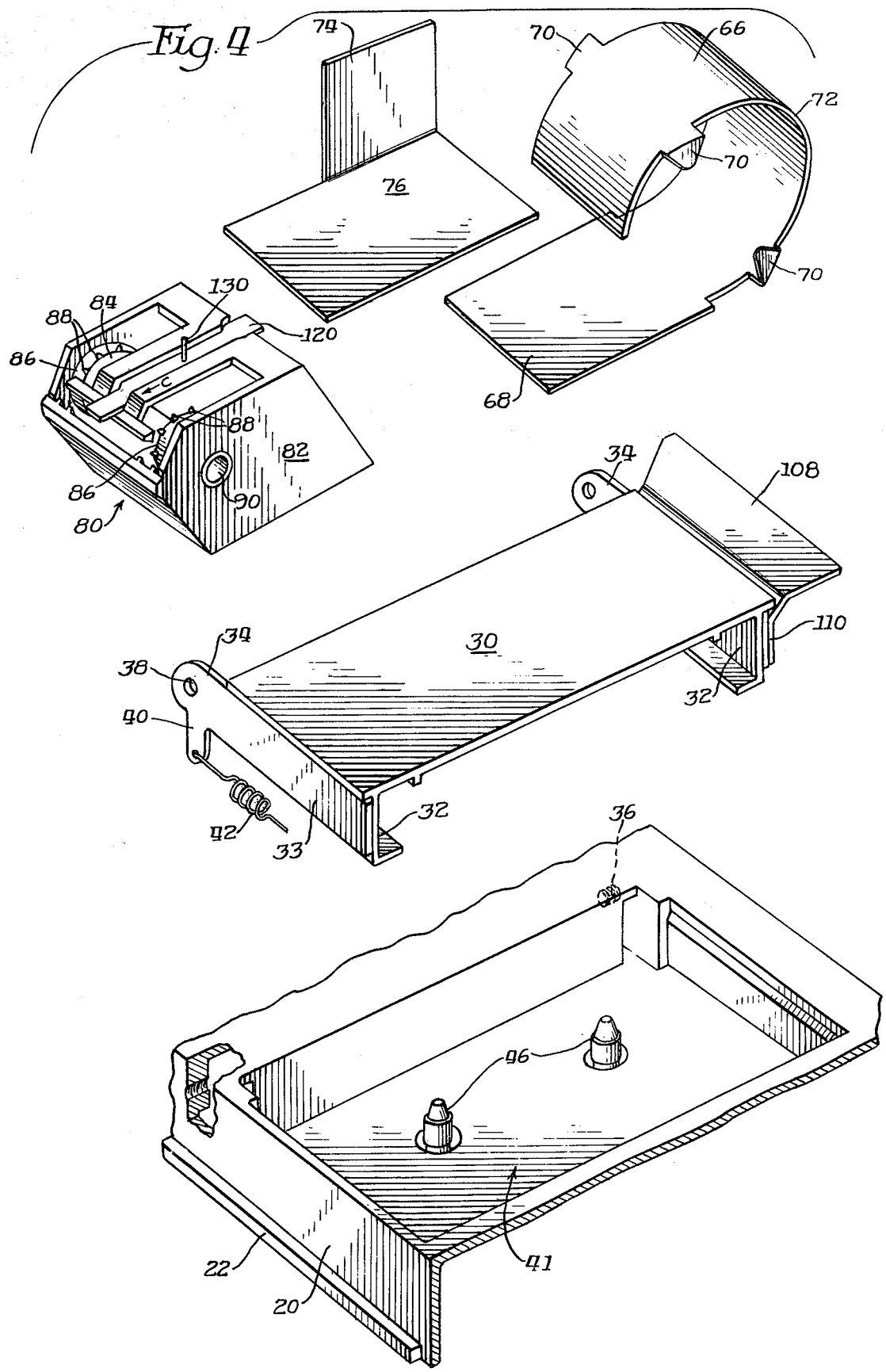

FILM HANDLING DEVICE

BACKGROUND OF THE INVENTION

1. Field of the Invention

This invention relates to film strip projectors and in particular to an improved film handling device on a projector adapted for use with audio tapes including messages recorded thereon which pertain to the visual content of the film.

2. Brief Description of the Prior Art

Film strip projectors are widely used in the instructional fields as well as in sales promotion and other endeavors. This media is especially suitable for such purposes, in that it permits the presentation of a selected illustration for varying time periods depending upon their informational content and thus conserves the amount of film required for a particular message. It will be appreciated that simultaneous performance of synchronized audio messages greatly increases the interest in and usefulness of the visual presentation. The illustrated embodiment is particularly suited for the projection of 35mm film but lends itself to other sizes as well. Generally, the film strips which are designed to be used with various film strip projectors are sold and dispensed in coiled form in a cylindrical container or "film can". Film strips of this type may be placed in a permanent cartridge such as that shown in copending patent applications Ser. Nos. 539,833 now U.S. Pat. No. 3,953,120, and 539,875, now U.S. Pat. No. 4,009,952, both filed Jan. 9, 1975, assigned to the assignee of the present invention, in order to be projected by such a projector. However, these cartridges require a considerably larger amount of storage space and added cost. Therefore, a desire and need has arisen for a film handling system which obviates the need for the film cartridges.

An object of the present invention is to provide a film handling device in the form of a cartridge which is permanently attached to the projector so that a film strip may be utilized in the projector directly from its storage container.

SUMMARY OF THE INVENTION

In accordance with the above and other objects, the present invention provides an improved film handling device for use with a film strip projector having a film drive means to store a predetermined length of film and to position the film, frame by frame, in an appropriate projection film gate on the projector. The film handling device includes a base plate pivotally mounted to a slidable carriage on the projector for movement between a first loading position and a second feeding position. A film storage cavity is provided on the base for storage of the film prior to viewing and a drive spindle associated with the projector drive means engages the film drive sprocket, located on the base plate, which drives the film from the storage cavity and moves the film past the film gate when the device is in its feed position.

Other objects, features and advantages of the invention will be apparent from the following detailed description taken in connection with the accompanying drawings.

BRIEF DESCRIPTION OF THE DRAWINGS

FIG. 4 is an exploded perspective view of the components of the film handling device of the present invention.

DESCRIPTION OF THE PREFERRED EMBODIMENT

Figure 1:
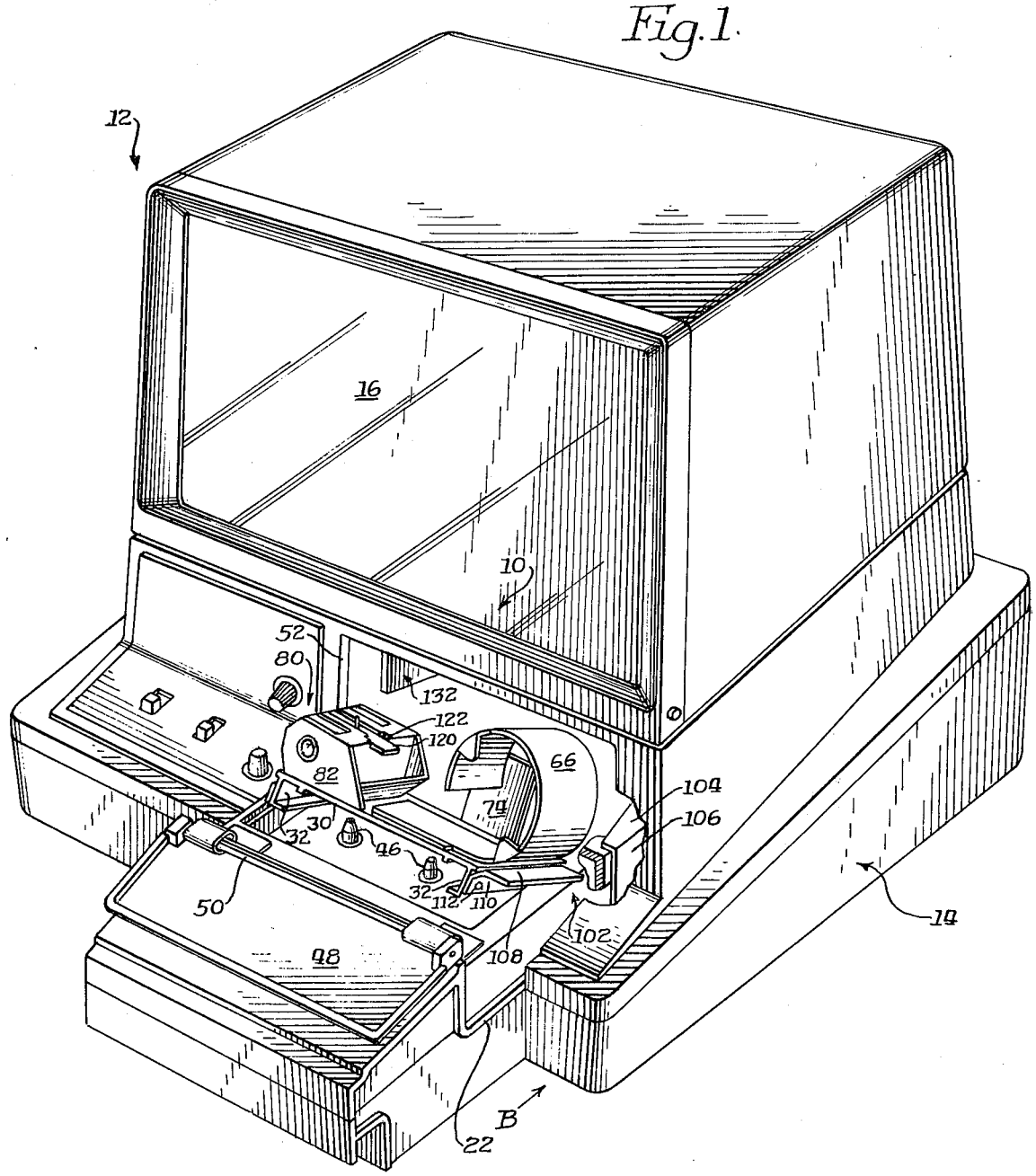
FIG. 1 is a perspective view of a film strip projector including a film handling device embodying the concepts of the present invention.

A film handling device, generally designated 10, made in accordance with the concepts of the present invention, is particularly adapted for use with a film strip projector, generally designated 12, as shown in FIG. 1. The film strip projector 12 is similar to the type shown and described in copending, commonly assigned, patent applications Ser. Nos. 539,833 and 539,875 filed Jan 9, 1975, respectively, and these disclosures are incorporated by reference herein.

Generally, the operation of the interior screen film strip projector 12 can be described with reference to FIG. 1. The projector 12 comprises a cabinet, generally designed 14, and a front wall 16 of frosted or translucent plastic or glass comprises a rear type projection screen upon which visual images are projected from the rear or interior of the projector 12.

A modified two-track audio cassette tape recorder, tape player or other carriage 20 is mounted within the cabinet 14 for use with the film strip projector of the present invention. The tape recorder 20 is slidably mounted by a pair of rails 22 for movement between a forward film loading position as shown in FIG. 1) and a rearward film feeding or projecting position, where the front of the tape recorder 20 is flush with the cabinet 14. The projector drive means is described in detail in the above-mentioned patent applications and need not be explained fully herein. Suffice it to say that a forwardly directed, splined drive shaft (not shown) is slideably engageable with the film handling device 10 as the tape recorder 20 is moved to feed a film strip 24 through the projector.

Prior to the present invention, a film cartridge, such as shown in FIGS. 3 through 6 of the above noted applications, was necessary in order to properly support and feed a film strip 24 into the projector. The present invention obviates the need for a specialized cassette and permits a simple coiled film strip 24 to be inserted directly into the film handling device 10. More particularly, referring to FIGS. 1, 2 and 4, the film handling device includes a flat, rectangular base plate 30. The base plate 30 includes a pair of depending L-shaped flanges 32 for supporting a conventional audio tape cassette. The flanges 32 each support an arm 33 having a rearward extension 34 which pivotally supports the base 30 by a pair of pins 36 on either side of the recorder 20 through appropriate apertures 38. A downwardly extended arm 40 is biased by a spring 42 connected to the recorder 20 to constantly urge the base 30 to an upward position, as shown in FIG. 1. The position as shown in FIG. 1 is defined herein as the loading position and permits the greatest amount of access to the film handling device 10.

The base plate 30 is pivotally mounted above a generally rectangular cavity 44 such as that found on conventional tape equipment designed for use with cassettes. A tape drive system (not shown) includes a pair of upwardly directed spindles 46 which engage the cassette reels and drives the tape in a normal manner. A plurality of control buttons are provided on the front top surface of the tape recorder 20, as shown in the copending applications. These control buttons are hidden from view in the present drawings by a cover door 48 (FIG. 1). The door 48 is pivotally mounted to the top of the recorder by a generally horizontal axle 50 to close an access cavity 52 in the projector cabinet 14 during projection of a film strip sequence. In the current embodiment, one of the sound tracks on the film cassette carries an audio message related to the images on the film strip and super-imposed on this audio message is an inaudible signal which automatically advances the film strip by known methods. Thus, once the film strip is properly positioned at an initial frame, a proper cassette tape will automatically index the film strip, frame by frame, through the projector.

Figure 2:
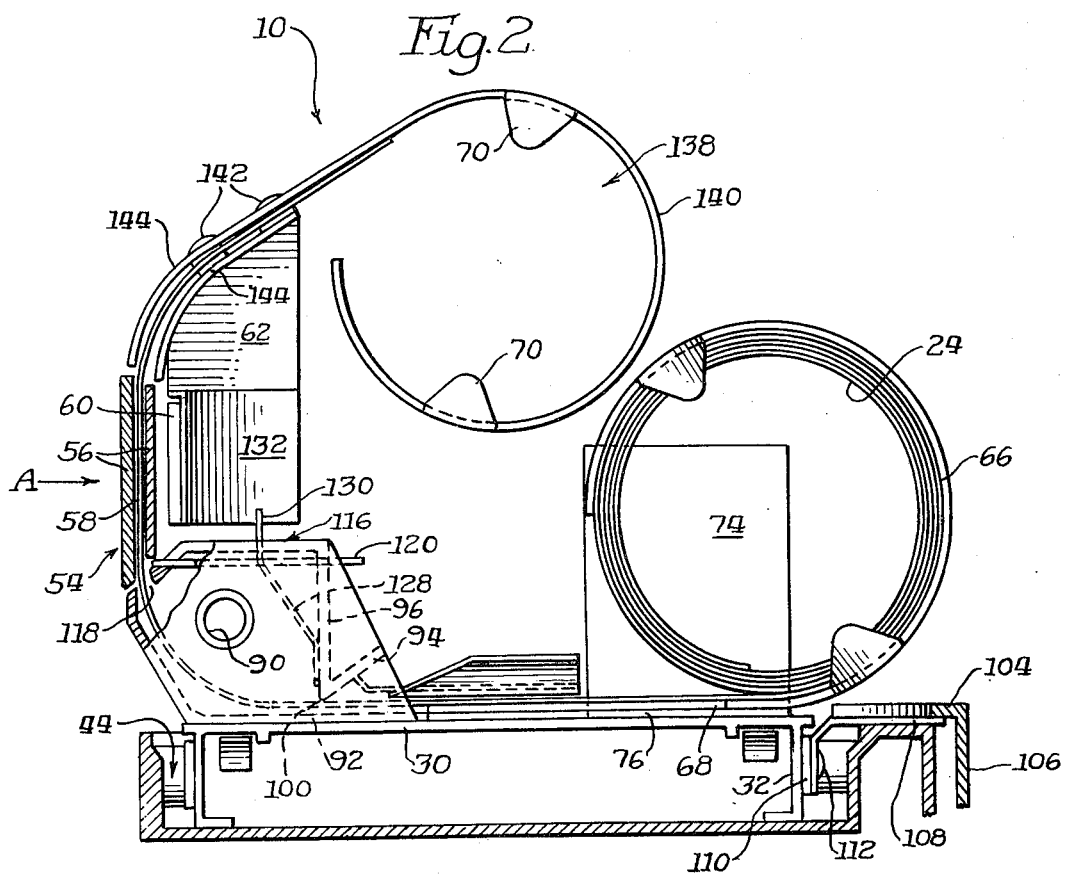
FIG. 2 is a fragmentary vertical section, on an enlarged scale, showing the film handling device in its feed position.
Figure 3:
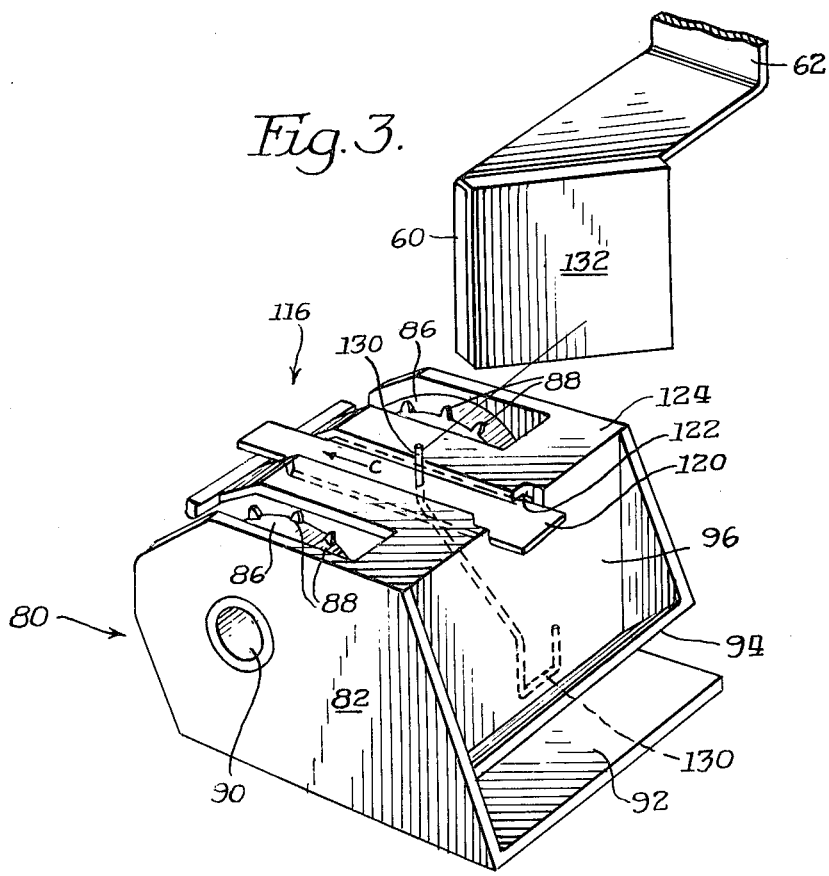
FIG. 3 is an exploded fragmentary perspective view, on an enlarged scale, showing the operation of the cam operated stop means.

Referring to FIG. 2, the film strip projector includes a projection gate, generally designated 54. The gate includes a pair of generally vertical guide plates 56 secured to the interior of the projector. The plates 56 define a channel 58 therebetween for guiding the film strip 24. A beam of light from a projection lamp enters the film gate generally in the direction of arrow A which passes through the image on the frame in the film gate 54 and is reflected rearwardly by a first mirror 60 within the projector by a stationary mirror support 62 at an angle of 45° with respect to the horizontal axis of the film gate. This mirror 60 reflects the image into a second mirror (not shown) at the back of the cabinet 14 which then reflects the image onto the rear of the screen 16. The guide plates 56 and the mirror 60 all are stationary elements secured to the interior of the projector.

The film handling device 10 includes a flexible, generally arcuate film storage element or cavity 66 (FIGS. 1, 2 and 4) which is secured by an elongated flat bottom portion 68 to the base plate 30. A plurality of radially directed film encapsulating tabs 70 are positioned about the periphery 72 of the storage element 66 to maintain the film within the spring. A generally vertical rear wall or film stop 74 is secured behind the storage cavity 66 (as shown in FIGS. 1 and 2) by a horizontal plate 76 secured to the base plate 30 below the spring extension portion 68. The wall 74 prevents a coiled film strip 24 from moving out from within the bounds of the storage element 66 when the coil is smaller in diameter than the inwardmost points of the tabs 70.

A film advancement means, generally designated 80, is mounted in alignment with the storage element 66 at the opposite end of the base plate 30. The film advancement means 80 includes a pair of generally vertical side walls 82 which rotatably support a film drive spool 84. The film drive spool 84 includes a central hub and a pair of parallel, spaced sprocket flanges 86 at either end. Each of the sprocket flanges 86 carries a plurality of sprocket teeth 88 which are spaced for engagement with the sprocket holes provided along the margins of the film strip 24. The internal portion of the spool 84 is hollow to define a splined receiver 90 for engagement with the projector drive shaft (not shown), as described in the above-mentioned applications. The film advancement means 80 includes a bottom wall 92 secured to the base plate 30 and a generally upwardly directed film guide wall 94 secured to a rear wall 96 to define a slot 100 for the passage of film to the spool 84.

The film handling device is pivoted upwardly by the spring 42 for convenience in loading a strip of film 24 into the storage element 66. However, for feeding of the film strip into the projection gate 54 of the projector 12, the film handling device 10 must be pivoted to a generally horizontal position.

To this end, a cam means, generally designated 102 (FIG. 1), is provided on the projector. The cam means 102 includes a generally tapered, horizontal plate 104 secured to a generally vertical flange 106 on the projector. A second cam following flange 108 is secured to the right side depending flange 32 of the base plate 30 by a vertical flange portion 110, as by rivets or screws 112 or the like. As the tape player 20 is manually moved rearwardly in the direction of arrow B of FIG. 1, along its support rails 22, the cam surface 108 engages the horizontal plate 104 causing the base plate 30 to pivot downwardly against the force of the biasing spring 42. In this manner, the cam means 102 properly horizontally aligns the film handling device 10 with the film gate 54 when the tape player 20 and the film handling device 10 are in their feed or project position.

To load a film strip 24, the user simply removes the film strip from the storage can and places it within the storage cavity 66. The film strip 24 then is manually engaged with the sprocket teeth 88 by sliding the film strip horizontally through the slot 100. However, because the tape player 20 must be manually pushed inwardly to properly align the film strip with the gate, it is desirable that the film strip be prevented from exiting the opposite end of the film advancement means 80. More particularly, a safety interlock or stop means, generally designated 116, is provided to prevent jamming of the film strip. A film strip 24 will exit the advancement means 80 through a slot 118 generally in the top thereof and in general vertical alignment with the channel 58 of the film projection gate 54. The stop means 116 will prevent exiting of the film strip 32 through the slot 118 unless the film handling mechanism 10 and tape player 20 are in their project position.

More particularly, a reciprocating film stop plate 120 is mounted for sliding movement in a slot 122 provided in a top closure wall 124 for the film advancement means 80. The stop plate 20 is biased in the direction of arrow C (FIGS. 3 and 4) by a wire spring 128. The wire spring 128 is secured to the interior of the back wall 96 by a generally U-shaped end 130. The top end 130 of the spring 128 emerges above the stop plate 120, as shown in FIGS. 1 through 4. The upwardly extending end 130 acts as a cam follower to move the stop plate 120 in a direction opposite that of arrow C, out of the path of the film strip 24 as the tape player 20 is moved to its project position. Particularly, the spring end 130 engages the forward canted wall 132 of the mirror support 62. This wall 132 is, as described above, positioned at a 45° angle so that, as the spring 130 engages the wall, the plate 120 is moved in a direction opposite that of arrow C. Thereafter, rotation of the drive spool 84 will feed the film strip through the projection gate 54 of the projector.

A storage cavity 138 is permanently provided by a similar arcuate spring 140 secured to the interior of the projector 12. The spring 140 is mounted by suitable connectors, such as rivets 142, to the mirror support 62. Thus, film passing through the film gate 54 is guided by a pair of arcuate film guide plates 144 to the interior of the spring 140 and coiled for storage. At the end of a projection of a sequence or film strip, the film can be rewound into the original storage spring 66 by reverse rotation of the drive spool 84. Finally, the tape player is moved forwardly and the film strip is removed manually for replacement into its storage container.

The foregoing detailed description has been given for clearness of understanding only and no unnecessary limitations should be understood therefrom as some modifications will be obvious to those skilled in the art.

I claim:

1. An improved film handling device for use with a projector having a film drive means, a projector gate, and including a tape cassette player for reproducing audible messages associated with the film frame image, the improvement comprising:

means for slidably mounting said tape cassette player for manual movement between a first loading position and a second playing position;

a support frame pivotally mounted to said tape cassette player, said support frame being adapted to removably mount a film strip and an audio tape cassette;

cam means on the projector for automatically moving said support frame relative to said tape cassette player from a first loading position, providing access to mount said audio cassette and said film strip thereon, to a second playing position generally within the projector, in conjunction with movement of said tape cassette player between its respective positions;

biasing means on the projector for automatically moving said support frame relative to the tape cassette player from said second playing position to said first loading position in conjunction with movement of said tape cassette player between its respective positions;

means defining a film storage cavity on said support frame for receiving and storing a predetermined length of coiled film for movement of the stored film into a position in alignment with the projector gate upon movement of the tape player to its playing position; and a film drive spool on the support frame associated with the film drive means for driving film from said storage cavity past the projector gate, said drive spool drivingly engaging said drive means when the tape player is moved to its playing position.

2. The film handling device of claim 1 wherein said film storage cavity comprises a flexible arcuate leaf spring including at least one inwardly directed radial film encapsulating tab.

3. The film handling device of claim 1 wherein said tape player includes drive means adapted for driving engagement with said cassette, said removably mounted cassette being pivotally moved between a disengaged position out of engagement with said tape player drive means and an engaged position in engagement with said tape player means as the tape player is moved between a first loading position and a second playing position.

4. An improved film handling device for use with a projector having a film drive means, a projector gate, and a tape player for reproducing audible messages associated with the film frame image, the improvement comprising:

means for slidably mounting said tape player for manual movement between a first loading position and a second playing position;

a support frame pivotally mounted to said tape player, said support frame being adapted to removably mount a film strip and an audio cassette;

cam means on the projector for automatically moving said support frame relative to said tape player between a first loading position generally outside of the projector, providing access to mount said audio cassette and said film strip thereon, and a playing position generally within the projector, in conjunction with movement of said tape player between its respective positions;

means defining a film storage cavity on said support frame for receiving and storing a predetermined length of coiled film and for moving the film into a position in alignment with the projector gate upon movement of the tape player to its playing position;

a film drive spool on the support frame associated with the film drive means for driving film from the storage cavity past the projector gate, said drive spool drivingly engaging said drive means when the tape player is moved to its playing position; and stop means associated with said drive spool for limiting the travel of the film by the drive spool when the tape player is in its first loading position to prevent jamming of the film as the tape player is moved to its second playing position.

5. An improved film handling device for use with a projector having a film drive means, a projector gate, and a tape player for reproducing audible messages associated with the film frame image, the improvement comprising:

means for slideably mounting said tape player for manual movement between a first loading position and a second playing position;

a support frame pivotally mounted to said tape player, said support frame being adapted to removably mount a film strip and an audio cassette;

cam means on the projector for automatically moving said support frame relative to said tape player between a first loading position generally outside of the projector, providing access to mount said audio cassette and said film strip thereon, and a playing position generally within the projector, in conjunction with movement of said tape player between its respective positions;

means defining a film storage cavity on said support frame for receiving and storing a predetermined length of coiled film and for moving the film into a position in alignment with the projector gate upon movement of the tape player to its playing position;

a film drive spool on the support frame associated with the film drive means for driving film from the storage cavity past the projector gate, said drive spool drivingly engaging said drive means when the tape player is moved to its playing position;

stop means associated with said drive spool for limiting the travel of the film by the drive spool when the tape player is in its first loading position to prevent jamming of the film as the tape player is moved to its second playing position, wherein said stop means includes a cam actuated member adjacent said drive spool, said cam actuated member being constantly urged into the path of travel of said film and including a protrusion thereon, said stop means further including a cam surface on the projector for engaging the protrusion and releasing said stop means as the tape player is moved from its first loading position to its second playing position to permit feeding of the film past the projection gate.

6. The film handling device of claim 5 including cam means on the projector for automatically moving the support frame from the first loading position to the playing position in response to movement of the tape player from its first position to its second position.

7. The film handling device of claim 6 wherein said cam means includes biasing means for constantly urging the support frame to its loading position, a stationary engaging member on the projector and a cam surface secured to the support frame to pivot the support frame to its playing position against the force of the biasing means as the tape player is moved from its first position to its second position as the cam surface engages the stationary member.

8. An improved film handling device for use with a projector having a film drive means, a projector gate, and including a tape cassette playing for reproducing audible messages associated with the film frame image, the improvement comprising:

means for slidably mounting said tape cassette player for manual movement between a first loading position and a second playing position;

a support frame pivotally mounted to said tape cassette player, said support frame being adapted to removably mount a film strip and an audio tape cassette, said support frame being automatically movable relative to said tape cassette player between a first loading position, providing access to mount said audio tape cassette and said film strip thereon, and a playing position;

biasing means associated with said support frame to constantly urge said support frame to move upwardly, said upwardly pivoted position defining the first loading position;

cam means on the projector for moving the support frame from said first loading position to said playing position against the force of the biasing means in response to movement of the tape player from its first position to its second position;

means defining a film storage cavity on said support frame for receiving and storing a predetermined length of coiled film and for moving the stored film into a position in alignment with the projection gate upon movement of the tape player to its playing position; and a film drive spool on the support frame associated with the film drive means for driving film from the storage cavity past the projection gate, said drive spool drivingly engaging said drive means when the tape player is moved to its playing position.

9. An improved film handling device for use with a projector having a film drive means for storing a predetermined length of coiled film and for positioning the film in a projector gate on the projector, the improvement comprising:

support means mounted on the projector on a carriage for movement between a first loading position and a second feeding position;

a film storage cavity on the support means;

a drive spool mounted on the support means for engagement with the projector drive means for receiving film from the storage cavity and moving the film past the projector gate when in the feed position; and stop means associated with said drive spool for limiting the travel of the film by the drive spool when the carriage is in its first loading position to prevent jamming of the film as the carriage is moved to its second feeding position, said stop means including a cam actuated plate having an upstanding pin thereon, said cam plate being constantly biased into the path of travel of the film, and a cam surface on the projector for engaging the pin and releasing said stop means as the carriage is moved from said first loading position to said second feed position to permit feeding of the film past the projection gate.

* * * * *